US012714041B2

(12) United States Patent
Rollwa

(10) Patent No.: US 12,714,041 B2
(45) Date of Patent: Aug. 25, 2026

(54) APPARATUS FOR GROWING PLANTS

(71) Applicant: Jungheinrich Aktiengesellschaft, Hamburg (DE)

(72) Inventor: Volker Rollwa, Pirmasens (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 18/212,407

(22) Filed: Jun. 21, 2023

(65) Prior Publication Data

US 2023/0413747 A1 Dec. 28, 2023

(30) Foreign Application Priority Data

Jun. 22, 2022 (EP) .................................... 22180324

(51) Int. Cl.
*A01G 31/00* (2018.01)
*A01G 31/02* (2006.01)

(52) U.S. Cl.
CPC .................................... *A01G 31/02* (2013.01)

(58) Field of Classification Search
CPC ........ A01G 31/00; A01G 31/02; A01G 31/06; A01G 31/042
See application file for complete search history.

(56) References Cited

U.S. PATENT DOCUMENTS 4,312,152 A * 1/1982 Drury et al. ........... A01G 31/02
5,324,657 A * 6/1994 Tanny .................... A01G 31/02 47/64
5,435,098 A * 7/1995 Koide .................. A01G 31/042 47/65
8,549,788 B2 * 10/2013 Bryan, III .............. A01G 31/02 47/62 C
10,251,350 B2 * 4/2019 Botman ................. A01G 24/30
10,383,292 B2 * 8/2019 Jollie ..................... A01G 31/02
10,653,076 B2 * 5/2020 Noordam ............. A01G 9/0295
10,694,688 B2 * 6/2020 Kitagawa ............. A01G 9/1438
11,343,984 B2 * 5/2022 Takeuchi ............... A01G 31/02
11,925,150 B2 * 3/2024 Marder-Eppstein ......................... A01G 27/008
2018/0235164 A1 * 8/2018 Chou .................... A01G 31/02
2022/0132750 A1 5/2022 Chen et al.
2022/0279742 A1 9/2022 Tremblay

FOREIGN PATENT DOCUMENTS

| | | |
|---|---|---|
| CN | 214282626 | 9/2021 |
| DE | 10 2020 125 904 | 4/2022 |
| JP | 2019-33674 | 3/2019 |
| WO | 2012/050449 | 4/2012 |
| WO | 2021/072550 | 4/2021 |

OTHER PUBLICATIONS

China Office Action conducted in counterpart China Appln. No. 202310731560.3 (Jan. 17, 2026).

* cited by examiner

*Primary Examiner* — Kristen C Hayes
(74) *Attorney, Agent, or Firm* — GREENBLUM & BERNSTEIN, P.L.C.

(57) ABSTRACT

An apparatus for growing plants includes a plant mat carrier having a plant mat support surface and a tray in which the plant mat carrier is arranged. The plant mat carrier is buoyant.

19 Claims, 3 Drawing Sheets

APPARATUS FOR GROWING PLANTS

CROSS-REFERENCE TO RELATED APPLICATION

This application claims priority under 35 U.S.C. § 119(a) to Europe Application No. 22 18 0324.0 filed Jun. 22, 2022, the disclosure of which is expressly incorporated by reference herein in its entirety.

BACKGROUND

1. Field of the Invention

Embodiments relate to an apparatus for growing plants that includes a plant mat carrier having a plant mat support surface, and comprising a tray in which the plant mat carrier is arranged.

An apparatus of this kind is used, in particular, when plants are to be grown in a greenhouse. In this case, the greenhouse can also be designed as a block storage arrangement in which the trays are stacked one above the other at a certain distance. The trays, possibly except for the lowermost tray, then have corresponding lighting devices on their underside in order to be able to illuminate the plants in the tray located underneath in each case.

2. Discussion of Background Information

In order to be able to grow the plants with as little effort as possible, seeds or seedlings are often placed on plant mats where they can be pre-germinated up to a particular stage. The developing plants will then have roots which penetrate the plant mats. The plant mats are or will then be introduced into a tray in which they are supplied with liquid and nutrients.

A particular problem is that of configuring the supply the plants in the plant mats such that the plants obtain not too much, but not too little, liquid. This is particularly difficult when the trays are not aligned exactly horizontally. In this case, the liquid is "askew" in the tray, and therefore some plants receive too much water and other plants receive too little water. In any case, very precise control of the supply of the liquid is required here. This makes growing plants in a greenhouse cumbersome.

SUMMARY

Embodiments are directed to making the growing of plants in a greenhouse, in particular in a block storage greenhouse, less prone to failure using simple components.

In embodiments, the plant mat carrier can be buoyant.

The plant mat carrier can then be laid in the tray, a plant mat being placed onto the support surface before or after laying the plant mat carrier in the tray. If liquid is then filled into the tray, the plant mat carrier then floats. This has the advantage that the plants on the plant mat carrier cannot be flooded. The plant mat carrier always ensures correct positioning of the plants on the plant mat carrier with respect to the surface of the liquid. Furthermore, this embodiment has the advantage that all plants are equally supplied with the liquid even with trays which are not aligned exactly horizontally. There are therefore no regions that are drier or wetter. Rather, the plant mat carrier automatically aligns itself with respect to the liquid surface, such that all plants are supplied uniformly.

Preferably, the tray has at least one liquid inflow and at least one liquid outflow. The irrigation of the plants in the tray can then be automated.

Preferably, the plant mat carrier has at least one floating body on its side arranged at the bottom in the direction of gravity. The floating body then ensures the buoyancy of the plant mat carrier. The choice of material for the plant mat carrier is made freer on account of the floating body. It is therefore also possible to use materials which have a greater specific weight than the liquid, in particular than the water. In this case, the buoyancy is achieved or at least assisted by the floating body.

Preferably, the plant mat carrier has a plurality of floating bodies which are arranged distributed symmetrically over its surface. In this case, it is no longer necessary to place the plant mat symmetrically on the plant mat carrier. Instead, the plurality of floating bodies ensure stable positioning of the plant mat carrier on the liquid located in the tray.

The floating body is preferably formed integrally with the plant mat carrier. There is therefore no risk that the floating body can become detached from the plant mat and that the buoyancy will be impaired.

It is also preferred that the at least one floating body is formed by shaping the plant mat carrier. This is a relatively simple way of forming the floating body integrally with the rest of the plant mat carrier.

It is also advantageous if the plant mat carrier is designed as a deep-drawn part. The deep-drawn part can then be formed from a planar material, for example a metal sheet or a plastic plate, by inserting said material into a press and forming it. As a result, the desired geometries can be achieved in a simple manner, in particular the shape or shapes which later form the floating body or bodies.

Preferably, the plant mat carrier has at least one through-opening outside the at least one floating body. The roots of the plants can then extend downward through the through-opening and reach the liquid located in the tray. It is no longer necessary for the roots to penetrate the material of the plant mat carrier, and therefore a greater degree of freedom is achieved for the choice of material for the plant mat carrier.

Preferably, a through-opening is arranged in a region at the corners of which a floating body is arranged in each case. The region in which the through-opening is arranged is therefore stabilized relative to the surface of the liquid in the tray.

Preferably, the plant mat carrier has at least one positioning stop as a boundary of the plant mat support surface. The plant mat cannot then slip on the plant mat carrier. In addition, this helps an operator with the positioning of the plant mat on the support surface.

The tray preferably has a plant mat carrier receiving space having a length which corresponds to n-times the length of the plant mat carrier, n being an integer, and/or the tray has a plant mat carrier receiving space having a width which corresponds to m-times the width of the plant mat carrier, m being an integer. In this case, the position of the plant mat carrier is also fixed in the tray. The width of the plant mat carrier extends parallel to the width of the tray, and the length of the plant mat carrier extends parallel to the length of the tray. If a plant mat carrier is laid in the tray and the length and width of the plant mat carrier receiving space correspond to the dimensions of the plant mat carrier, the plant mat carrier is then reliably held. If the length and/or the width corresponds to an integer multiple of the length and/or width of the plant mat carrier, a correspondingly larger number of plant mat carriers can be laid in the tray, the plant mat carriers then mutually positioning one another and, in this case as well, a change in position of the plant mat carriers in the tray being practically impossible. Here as well, the advantage of the buoyancy of the plant mat carriers is again evident. The plant mat carriers, which are constructed the same and therefore are equally buoyant, cannot slide over each other when liquid is filled into the tray.

It is also advantageous that the plant mat carrier receiving space has, on at least one end, a stop which tapers upward in the direction of gravity. When a fill level of the liquid in the tray drops, the plant mat carriers then drift downward in the direction of gravity and are then guided exactly into their position with little effort by the downwardly thickening stop.

Preferably, at least one stop is formed by a thickening of an inner side of a wall of the tray. The stop can then be formed integrally with the wall, which facilitates the manufacture of the tray.

It is preferred here that the wall has an outer side and the thickening continues on the outer side. The stop then simultaneously stabilizes the wall of the tray.

Embodiments are directed to an apparatus for growing plants that includes a plant mat carrier having a plant mat support surface, and a tray in which the plant mat carrier is arranged. The plant mat carrier is buoyant.

According to embodiments, the tray can have at least one liquid inflow and at least one liquid outflow.

In accordance with embodiments, at least one floating body may be arranged on a bottom side of the plant mat carrier with reference to a direction of gravity. The at least one floating body can include a plurality of floating bodies that are arranged to be distributed symmetrically over a surface on the bottom side. Further, the at least one floating body may be integrally formed with the plant mat carrier. The at least one floating body may be formed by a shape of the plant mat carrier. The shape has a pot-like design. Moreover, the plant mat carrier can be formed as a deep-drawn part. Also, the plant mat carrier may have at least one through-opening arranged outside of the at least one floating body. The at least one through-opening can include through-openings arranged in a region at corners of which the at least one floating body is arranged.

In embodiments, the plant mat carrier may have at least one positioning stop as a boundary of the plant mat support surface.

According to other embodiments, at least one of: the tray can have a plant mat carrier receiving space with a length corresponding to n-times a length of the plant mat carrier, where n is an integer, or the tray can have a plant mat carrier receiving space with a width corresponding to m-times a width of the plant mat carrier, where m being an integer. The plant mat carrier receiving space may have, on at least one end, at least one stop which tapers upward in the direction of gravity. Further, the at least one stop is formed by a thickening of an inner side of a wall of the tray. The wall can have an outer side, and the thickening continues on the outer side.

Embodiments are directed to an apparatus for growing plants that includes a plurality of plant mat carriers, each of the plurality of plant mat carriers having a plant mat support surface, and a tray in which the plurality of plant mat carriers is positionable. Each of the plurality of plant mat carriers is buoyant.

According to embodiments, the plurality of plant mat carriers may be positioned in the tray to be separated from each other in at least one of a length or width direction of the tray.

In accordance with still yet other embodiments, each of the plurality of plant mat carriers can include floats on a bottom surface to float on liquid supplied to feed and nourish the growing plants. The apparatus can further include a plurality of plant mats, in which a plant mat is positioned on each plant mat support surface. The plant mat support surfaces may include through-openings and the floats on the plant mat carriers can maintain a separation between the plant mats and the liquid supplied to feed and nourish the growing plants.

Other exemplary embodiments and advantages of the present invention may be ascertained by reviewing the present disclosure and the accompanying drawing.

BRIEF DESCRIPTION OF THE DRAWINGS

The invention is described below with reference to a preferred embodiment in conjunction with the drawing, in which.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
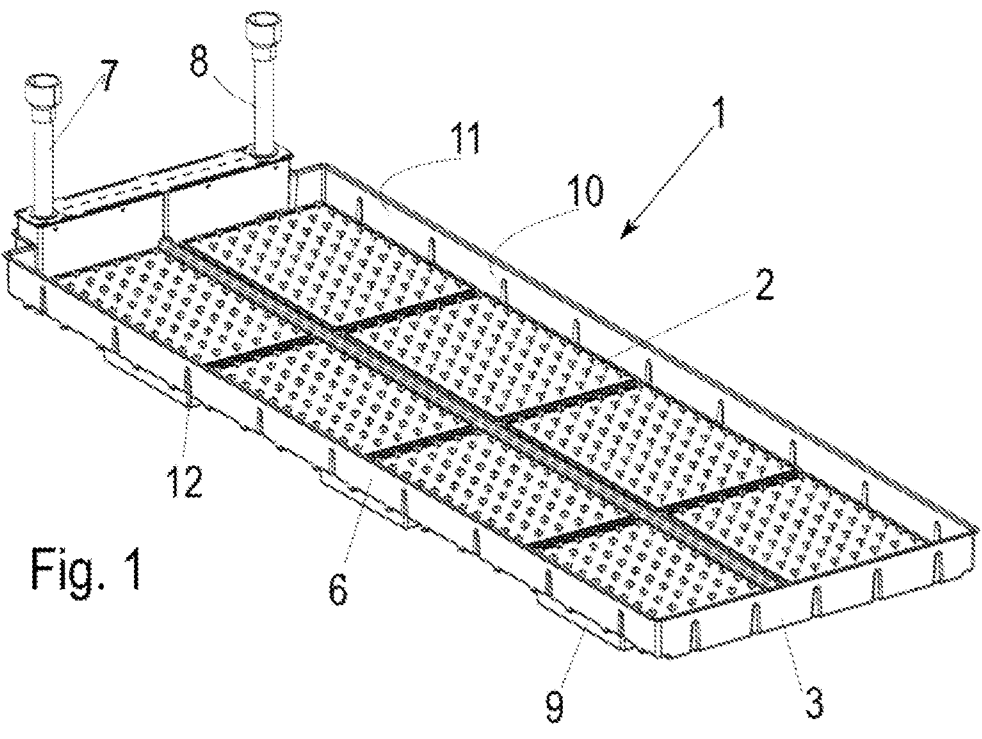
FIG. 1 shows a tray having a plurality of plant mat carriers.
Figure 2:
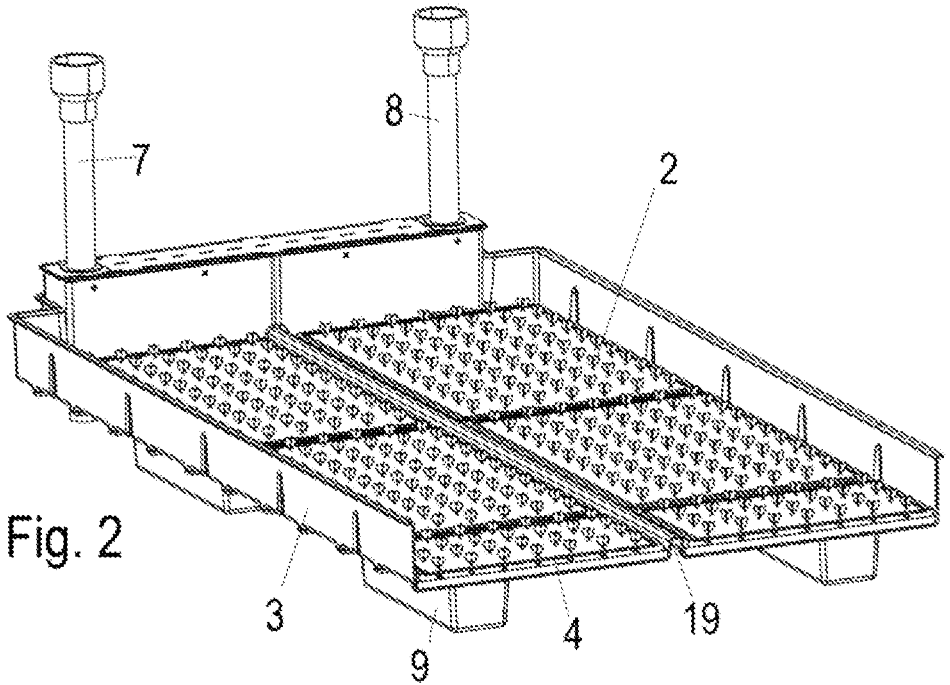
FIG. 2 shows the tray from FIG. 1, partially in section.
Figure 3:
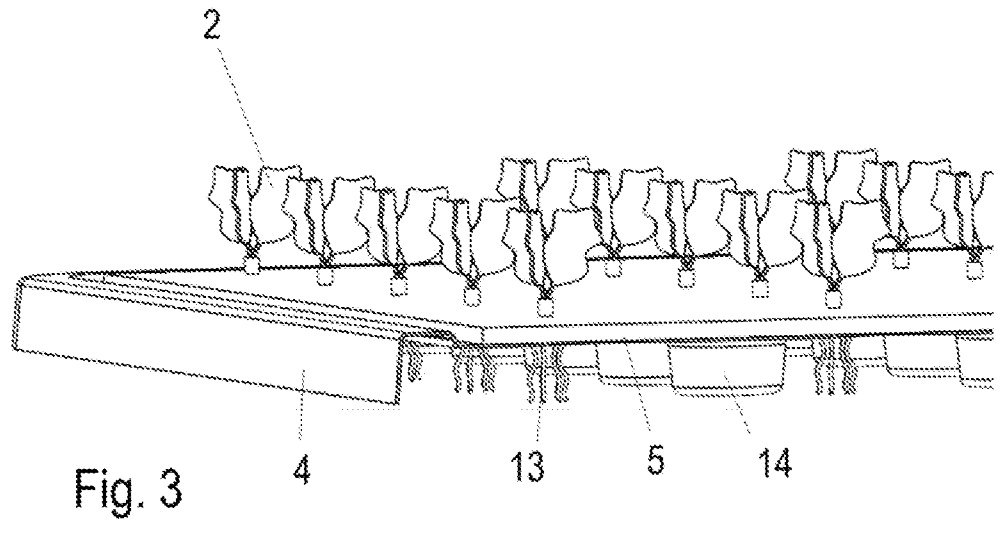
FIG. 3 shows a plant mat carrier having a plant mat and plants.

FIGS. 1 and 2 show an apparatus 1 for growing plants 2 using a tray 3. Plant mat carriers 4 (FIG. 3) are arranged in the tray 3. A plant mat 5 with plants 2 which are to grow on the plant mat 5 is located on each plant mat carrier 4.

The tray 2 has a liquid inflow 7 and a liquid outflow 8. The liquid outflow 8 is actually directed downward. The liquid outflow shown in FIGS. 1 and 2 is the liquid outflow of another tray arranged above the depicted tray 3 during operation.

On its lower side in the direction of gravity, the tray 3 has a plurality of runners 9 and, if applicable, lighting bodies (not shown) by which plants 2 of a tray 3 arranged below the depicted tray 3 during operation can be illuminated.

A total of eight plant mat carriers are fitted, and therefore eight plant mats 5 are also arranged in the tray 3 shown in the exemplary embodiments depicted in FIGS. 1 and 2. For this purpose, the tray 3 has a receiving space of which the length corresponds to 4 times the length of the plant mat carrier 4 and of which the width corresponds to 2 times the plant mat carrier 4. The length is a distance between stops 10 on a longitudinal side of the tray 3, and the length is the distance between corresponding stops on the narrow sides of the tray 3. The stops 10 are formed as thickenings of a wall 11 of the tray 3. These thickenings continue on the outer side of the tray 3, as indicated by the reference sign 12.

Figure 4:
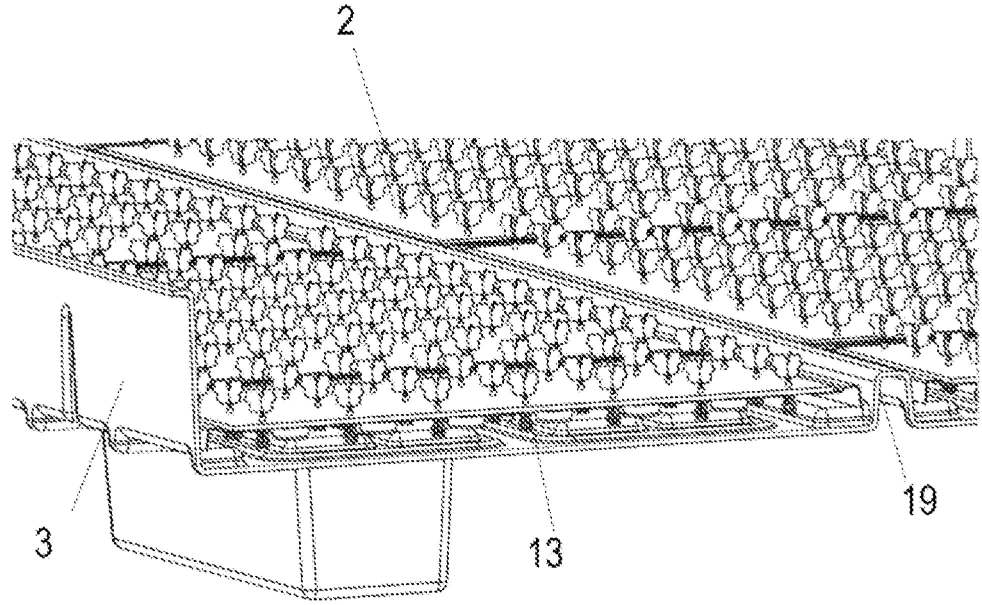
FIG. 4 shows the plant mat carrier of FIG. 3 in the tray.

As shown, for example, in FIGS. 2 and 4, the tray 3 can have a reinforcing projection 19 which, as shown, extends over the length of the tray 3. Corresponding reinforcing projections 19 can also be provided in the direction of the width.

The length and/or the width of the reinforcing projections 19 must naturally be taken into account as a multiple of the width and/or length of the plant mat carriers 4 when dimensioning the receiving space.

The plant mat carrier 4 is buoyant. Therefore, if a liquid is filled into the tray 3, the plant mat carrier 4 then floats before the liquid reaches the plant mat 5. However, the plants have roots 13 which project through the plant mat carrier 4 and which can therefore enter the liquid. The plant mat carrier 4 floats to such an extent that there is always a certain distance between the plant mat 5 and the liquid, such that the roots 13 can also be supplied with oxygen from the air.

The buoyancy of the plant mat 4 is caused in particular by floating bodies 14 which are arranged on the underside (in the direction of gravity) of the plant mat carrier 4. As can be seen in particular in FIG. 6, the plant mat carrier 4 has a plurality of floating bodies 14 which are arranged distributed symmetrically over the surface of the plant mat carrier 4.

The floating bodies 14 are formed integrally with the plant mat carrier 4, in particular by shaping the plant mat carrier 4. The shapes which form the floating bodies 14 are designed like a pot, i.e., they also form a depression 15 (FIG. 5) in the upper side of the plant mat carrier 4. The plant mat carrier 4 can be designed in a simple manner as a deep-drawn part, for example, from a metal sheet or from a plastic plate.

Figures 5, 6:
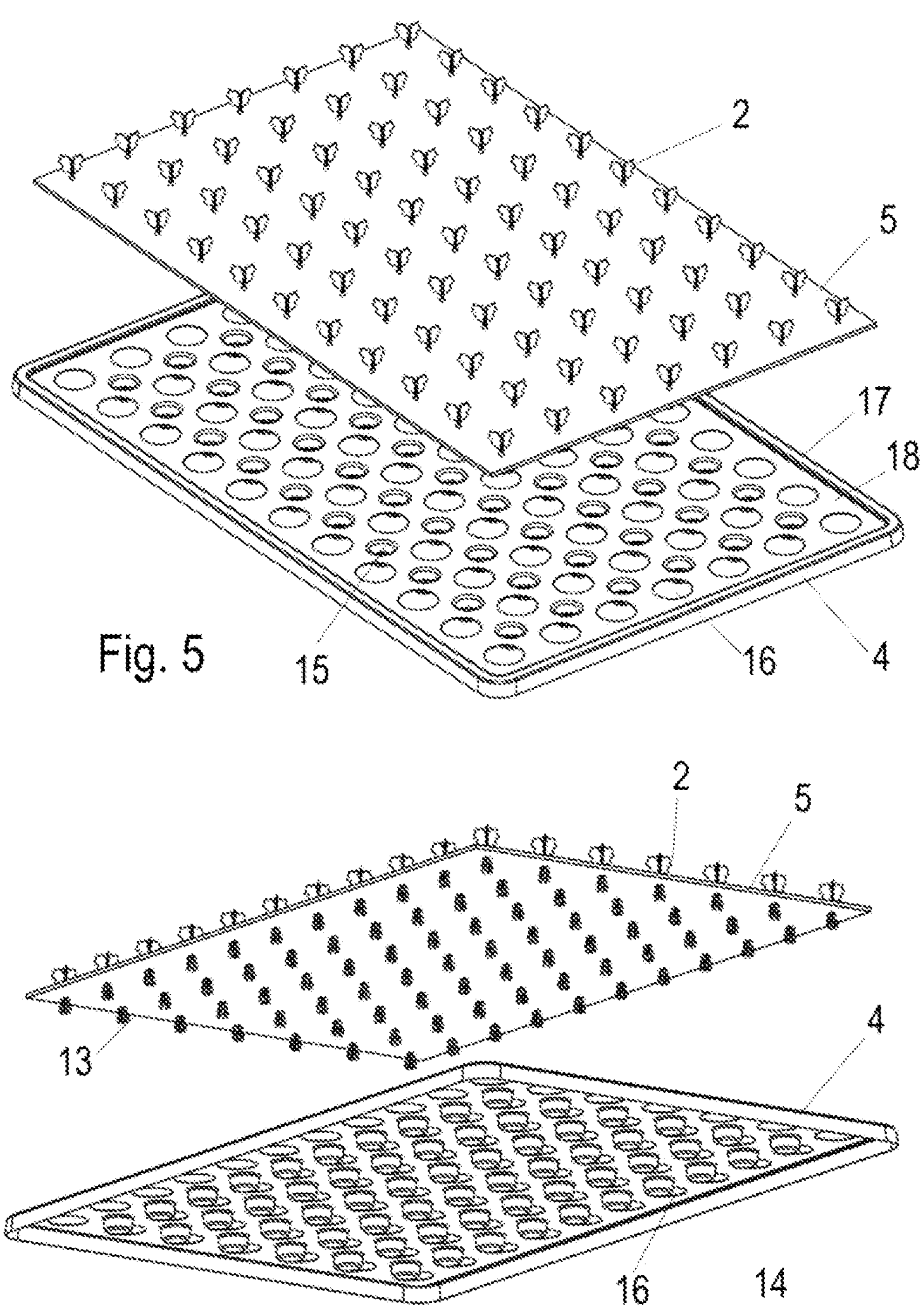
FIG. 5 shows an exploded view of a plant mat carrier and plant mat obliquely from above.
FIG. 6 shows an exploded view of a plant mat carrier and plant mat obliquely from below.

As can be seen, in particular in FIGS. 5 and 6, the plant mat carrier has a plurality of through-openings 16 through which the roots 13 can project into the liquid below the plant mat carrier 4. In most cases, a through-opening 16 is arranged in a region at the ends of which a floating body 14 is always arranged. However, this does not apply in the corners and the edges of the plant mat carrier 4.

The plant mat carrier 4 has a circumferential positioning stop 17 on its edge. The positioning stop 17 serves as a boundary of a plant mat support surface 18 onto which the plant mat 5 is placed. The plant mat support surface 18 has the same size as the plant mat 5. The positioning stop 17 therefore forms a positioning aid when the plant mat 5 is placed on the plant mat carrier 4.

If plants 2 are to grow in the apparatus 1, seeds or seedlings are deposited on the plant mat 5 in a first step inside or outside the apparatus 1 and are germinated there. The plant mat 5 can be provided with the seed or seedlings automatically, specifically in a grid which corresponds to the through-openings 16. The plant mats 5 with the pre-germinated plants 2 are then deposited on the plant mat carriers 4, and the plant mat carriers 4 are laid in the tray 3. The trays 3 can then be moved into the greenhouse and, if the greenhouse is a block storage arrangement, stacked.

The light required for growth is provided by the above-mentioned lighting devices. Liquid with corresponding nutrients is supplied and discharged via the liquid inflow 7 and the liquid outflow 8. No particularly stringent requirements have to be imposed on the control of the liquid height in the tray 3, since the plant mat carriers 4 float. If sufficient liquid is filled into the tray 3, the liquid cannot flood the plant mats 5 and wash the plant mats 5 away from the plant mat carriers 4. However, the roots 13 can protrude into the liquid and absorb liquid and nutrients there.

When the liquid is drained out of the tray, the plant mat carriers 4 then rest again on the bottom of the tray 3. Even if the tray 3 is not aligned exactly horizontally, there is no problem of some plants being oversupplied and other plants being undersupplied. Due to the buoyancy of the plant mat carrier, the plant mat carrier 4 aligns itself by its plant mat support surface 18 exactly parallel to the surface of the liquid, such that the plants 2 located on a plant mat carrier 4 are all subjected to the same conditions.

The plant mats can be formed, for example, from a nonwoven material. The plant mat carrier 4 is reusable.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An apparatus for growing plants, comprising:
- a plant mat carrier having a plant mat support surface, and
- a tray configured to contain a liquid and in which the plant mat carrier is arranged,
- wherein the plant mat carrier is buoyant to float on the liquid, and
- wherein a plant mat is arranged on the plant mat carrier to maintain a distance between the plant mat and the liquid,
- wherein at least one floating body is arranged on a bottom side of the plant mat carrier with reference to a direction of gravity,
- wherein the at least one floating body is integrally formed with the plant mat carrier,
- wherein the at least one floating body is formed by a shape of the plant mat carrier, and
- wherein the shape has a pot design.

2. The apparatus according to claim 1, wherein the tray has at least one liquid inflow and at least one liquid outflow.

3. The apparatus according to claim 1, wherein the at least one floating body comprises a plurality of floating bodies that are arranged to be distributed symmetrically over a surface on the bottom side.

4. The apparatus according to claim 1, wherein the plant mat carrier is formed as a deep-drawn part.

5. The apparatus according to claim 1, wherein the plant mat carrier has at least one positioning stop as a boundary of the plant mat support surface.

6. The apparatus according to claim 1, wherein at least one of:
- the tray has a plant mat carrier receiving space with a length corresponding to n-times a length of the plant mat carrier, where n is an integer, or
- the tray has a plant mat carrier receiving space with a width corresponding to m-times a width of the plant mat carrier, where m being an integer.

7. The apparatus according to claim 6, wherein the plant mat carrier receiving space has, on at least one end, at least one stop which tapers upward in the direction of gravity.

8. The apparatus according to claim 7, wherein the at least one stop is formed by a thickening of an inner side of a wall of the tray.

9. The apparatus according to claim 8, wherein the wall has an outer side, and the thickening continues on the outer side.

10. The apparatus according to claim 1, wherein the distance maintained between the plant mat and the liquid is configured to supply oxygen to roots of the growing plants.

11. An apparatus for growing plants, comprising:

a plant mat carrier having a plant mat support surface, and a tray configured to contain a liquid and in which the plant mat carrier is arranged, wherein the plant mat carrier is buoyant to float on the liquid, and wherein a plant mat is arranged on the plant mat carrier to maintain a distance between the plant mat and the liquid, wherein the tray has at least one liquid inflow and at least one liquid outflow, wherein at least one floating body is arranged on a bottom side of the plant mat carrier with reference to a direction of gravity, wherein the plant mat carrier has at least one through-opening arranged outside of the at least one floating body, and wherein the at least one through-opening comprises through-openings arranged in a region at corners of which the at least one floating body is arranged.

12. An apparatus for growing plants, comprising:

a plurality of plant mat carriers, each of the plurality of plant mat carriers having a plant mat support surface, and a tray configured to contain a liquid and in which the plurality of plant mat carriers is positionable, wherein each of the plurality of plant mat carriers is buoyant to float on the liquid, wherein at least one plant mat is arranged on the plurality of plant mat carriers to maintain a distance between the at least one plant mat and the liquid, wherein at least one floating body is arranged on a bottom side of each of the plurality of plant mat carriers with reference to a direction of gravity, wherein the at least one floating body is integrally formed with the plant mat carrier, wherein the at least one floating body is formed by a shape of the plurality of plant mat carriers, and wherein the shape has a pot design.

13. The apparatus according to claim 12, wherein the plurality of plant mat carriers are positioned in the tray to be separated from each other in at least one of a length or width direction of the tray.

14. The apparatus according to claim 12, wherein each of the plurality of plant mat carriers include floats on a bottom surface to float on liquid supplied to feed and nourish the growing plants.

15. The apparatus according to claim 14, further comprising a plurality of plant mats, wherein a plant mat is positioned on each plant mat support surface.

16. The apparatus according to claim 15, wherein the plant mat support surfaces include through-openings and wherein the floats on the plant mat carriers maintain a separation between the plant mats and a liquid supplied to feed and nourish the growing plants.

17. The apparatus according to claim 12, wherein the distance maintained between the at least one plant mat and the liquid is configured to supply oxygen to roots of the growing plants.

18. The apparatus according to claim 12, wherein the tray has at least one liquid inflow and at least one liquid outflow.

19. An apparatus for growing plants, comprising:

a plurality of plant mat carriers, each of the plurality of plant mat carriers having a plant mat support surface, and a tray configured to contain a liquid and in which the plurality of plant mat carriers is positionable, wherein each of the plurality of plant mat carriers is buoyant to float on the liquid, wherein at least one plant mat is arranged on the plurality of plant mat carriers to maintain a distance between the at least one plant mat and the liquid, wherein the tray has at least one liquid inflow and at least one liquid outflow, wherein at least one floating body is arranged on a bottom side of each of the plurality of plant mat carriers with reference to a direction of gravity, wherein each of the plurality of plant mat carriers has at least one through-opening arranged outside of the at least one floating body, and wherein the at least one through-opening comprises through-openings arranged in a region at corners of which the at least one floating body is arranged.

* * * * *